(12) United States Patent
Hewitt et al.

(10) Patent No.: US 7,538,876 B2
(45) Date of Patent: May 26, 2009

(54) EFFICIENT AND ACCURATE ALIGNMENT OF STEREOSCOPIC DISPLAYS

(75) Inventors: Gordon S. Hewitt, Trabuco Canyon, CA (US); John O. Merritt, Williamsburg, MA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 11/423,678

(22) Filed: Jun. 12, 2006

(65) Prior Publication Data

US 2007/0285663 A1    Dec. 13, 2007

(51) Int. Cl.
*G01J 4/00* (2006.01)
(52) U.S. Cl. ...................................... 356/364
(58) Field of Classification Search .................. 356/364
See application file for complete search history.

(56) References Cited

U.S. PATENT DOCUMENTS

| | | | |
|---|---|---|---|
| 4,298,176 A | 11/1981 | Kendall | |
| 5,572,229 A | 11/1996 | Fisher | |
| 5,644,427 A | 7/1997 | Omori et al. | |
| 5,774,175 A | 6/1998 | Hattori | |
| 5,818,399 A | 10/1998 | Omori et al. | |
| 5,976,017 A | 11/1999 | Omori et al. | |
| 6,069,649 A | 5/2000 | Hattori | |
| 6,593,957 B1 | 7/2003 | Christie | |
| 6,703,988 B1 | 3/2004 | Fergason | |
| 2006/0033992 A1* | 2/2006 | Solomon | 359/462 |

FOREIGN PATENT DOCUMENTS

| | | |
|---|---|---|
| FR | 2838598 | 10/2003 |
| FR | 2838598 A1 * | 10/2003 |

OTHER PUBLICATIONS

Yoshida et al., Design and Applications of a High Resolution Insert Head Mounted Display, http://www.cs.duke.edu/~reif/paper/yoshida/hmd.pdf, Jun. 1994.
International Application PCT/US2007/013677 International Search Report and Written Opinion. Feb. 22, 2008.

* cited by examiner

*Primary Examiner*—Roy Punnoose
(74) *Attorney, Agent, or Firm*—Canady & Lortz LLP; Bradley K. Lortz

(57) ABSTRACT

A method and apparatus for aligning the left and right image channels a two-image stereoscopic three-dimensional display is disclosed. A left and right alignment pattern may be shown on the left-eye and right-eye image screens, respectively, pre-computed for any given input imaging geometry. The operator (or alignment processor) then adjust the displays to converge the superimposed left-eye and right-eye test patterns by moving the display elements using display positioning equipment and/or software. This ensures that the stereoscopic three-dimensional display geometry matches the three-dimensional camera imaging geometry in order to produce a minimally-distorted visual depth perception of objects in space. Such precision alignment can be essential for efficient and safe telerobotic operation applications, as in the case of remote aerial refueling operations, for example.

24 Claims, 7 Drawing Sheets

EFFICIENT AND ACCURATE ALIGNMENT OF STEREOSCOPIC DISPLAYS

BACKGROUND OF THE INVENTION

1. Field of the Invention

This invention relates to stereoscopic three-dimensional displays. Particularly, this invention relates to systems and methods for the alignment of stereoscopic three-dimensional displays such as may be employed in aerospace applications.

2. Description of the Related Art

Stereoscopic three-dimensional displays function through the synchronized presentation of different images to the left and right eyes of a user. In principle, the images are differentiated to simulate the parallax that would naturally occur between two eyes of a viewer if actually present at the camera location. Thus, the brain can process the differentiated images normally to provide depth perception to the user. Alignment of the separate images at the point where they are received by the separate eyes is an important factor in the development of any stereoscopic three-dimensional display system.

Mismatch between display geometry and camera geometry can cause operational inefficiency of the application employing the display, visual fatigue, and image distortion, among other negative effects. Such mismatch can result in errors and unsafe operation of remotely-controlled equipment employing the display system. Operators will suffer visual fatigue, discomfort, and/or headaches, limiting the allowable operational period. Such displays present distorted and/or misaligned images. Such systems can suffer from operator complaints which may ultimately lead to abandonment of the poorly performing stereoscopic three-dimensional display system.

However, correct binocular alignment of a dual-image stereoscopic three-dimensional display can be complicated and prone to error. In addition, proper alignment of such displays typically requires special expertise not always available. Because of these and other factors, it is usually not practical to employ a single dual-channel stereoscopic three-dimensional display applied to different imaging geometries (e.g. different input cameras), since this would require time-consuming and difficult re-alignment of the display to match inputs from a different imaging geometry.

Currently available stereoscopic three-dimensional displays are therefore limited, practically, to use with only one type of input geometry, since it is often too difficult to change back and forth between different input imaging configurations. For example, the correct alignment of display elements inside a dual-channel stereoscopic three-dimensional display depends on the convergence angle of the left and right cameras, and whether this convergence is accomplished by toe-in of the cameras or by lateral shifting of the lenses relative to the imaging chips.

If an operator could simply select the input imaging parameters on the display unit, such as camera field of view, convergence distance, and convergence toe-in angle, the stereoscopic three-dimensional display could be designed to provide assistance in correctly aligning the display geometry to match the imaging geometry, either by automatically moving the display components, or providing visual feedback to the operator with easy-to-use test patterns that allow for accurate manual alignment.

Current stereoscopic three-dimensional displays do not provide assistance in or accommodate the need for alignment of left and right display images to correctly match imaging system geometry (e.g., camera convergence and alignment). When imaging geometry is complex, due to camera convergence, and left and right display-channel components are viewed through refractive and reflective optical elements, the process of correct alignment is difficult and requires expertise not always available.

There are some existing auto-alignment techniques used for aligning multiple projectors in non-stereo simulator displays. Separately, Barco has mentioned an alignment system using lasers for their large-screen stereoscopic theater system. Some auto-convergence systems and test patterns have been previously developed for 3-tube CRT video projectors in the previous decades for matching up the red, green, and blue projected images, however, such techniques are not directly applicable to the alignment of stereoscopic three-dimensional displays. For example, they incorporate no concept of aligning two distinct images, one for each eye, to create a three-dimensional perception. Such systems are directed to the alignment of different components of the same image. In addition, current stereoscopic three-dimensional systems do not provide the means for an operator to check and/or adjust the display alignments required for different camera configurations.

U.S. Pat. No. 4,298,176 by Kendall, issued Nov. 3, 1981, describes a refueling system, for use in a tanker aircraft from a remote location without a direct out-the-window view of the refueling operation, having enhanced three-dimensional viewing of the refueling operation by use of multiple video cameras, polarized video monitors and cross-polarized eye glasses together with controls for movement of the boom tip in elevation and azimuth, as well as controls for extension of the boom tip.

U.S. Pat. No. 6,703,988 by Fergason, issued Mar. 9, 2004, describes a display system or monitor arrangement for stereoscopic three-dimensional displaying of images including a pair of displays for providing respective left eye and right eye images and arranged in perpendicular intersecting planes, a beam splitter for combining the images from the displays in a common light path, and a means to discriminate between respective images to present the respective left and right eye images to the eyes of a viewer for viewing. Image discriminating functions may be obtained using plane polarized light characteristics and/or circular polarized light characteristics. A package arrangement retains the display a system components for storage or use; and a cubical mount structure may provide alignment and positioning of respective parts of the display system. Display methods for displaying stereoscopic images in a common light path are included.

U.S. Pat. No. 6,593,957 by Christie, issued Jul. 15, 2003, describes autostereoscopic image displays providing realistic three-dimensional images to one or a plurality of viewers without the need for wearable appliances. In some embodiments, the images are viewed through a beamsplitter, while in other embodiments the viewer observes the images on a display screen. A viewer-tracking system monitors the viewer's movements and directs each image of a stereopair to the proper eye of the viewer. In some embodiments, the stereoimages are kept independent and separately directed through differential polarization. In other embodiments, this is accomplished through selective intensity modulation.

U.S. Pat. No. 5,976,017 by Omori et al., issued Nov. 2, 1999, describes a stereoscopic-image game playing apparatus displaying a screen image for right eye and a screen image for left eye on an LCD, outputs images of the player obtained by cameras to the receiving side, and displays images corresponding to the right half face and the left half face of the player based on the player's images on a second LCD. The images displayed on the second LCD are used as figures for selectively introducing lights from the screen images on the first LCD, by a lens, to the right and left eyes of the player. This enables stereoscopic vision without glasses for separating images respectively for the player's right and left eyes, and allows the player to move from the initial position.

U.S. Pat. No. 5,644,427 by Omori et al., issued Jul. 1, 1997, describes screen images for the right eye and for the left eye are displayed upside down on two image display devices, respectively, and images of right half and left half faces of the viewers picked-up by two image sensing devices are displayed on two spatial modulation elements. By seeing the screen images transmitted through the images of the right half and the left half faces, which are light transmission images, on the spatial modulation elements, and through lenses, having directivities, the right eyes and the left eyes of the viewers can respectively see the screen images for the right eyes and for the left eyes, which are combined by a half mirror.

U.S. Pat. No. 6,069,649 by Hattori, issued May 30, 2000, describes a stereoscopic three-dimensional display which enables plural persons to simultaneously observe stereoscopic images includes a color liquid crystal plate for displaying stereo-pairs composed of left and right eye perspectives in time-interlaced manner, a monochrome TV display disposed behind the color liquid crystal plate for displaying binary and inverted binary images of half face of each observer so as to be synchronized with the time-interlaced display of the color liquid crystal plate, and a large convex lens disposed between the color liquid crystal plate and the monochrome TV display so as to focus the observers' optical images on the screen of the monochrome TV display in geometrical agreement with the observers' face images displayed thereby. And an infrared TV camera is disposed so as to take observers' images by way of the large convex lens and input observers' face images to the monochrome TV display.

U.S. Pat. No. 5,774,175 by Hattori, issued Jun. 30, 1998, describes a stereoscopic television which enables plural observers to simultaneously observe a stereoscopic images includes a color liquid-crystal plate, a monochrome TV display disposed behind the liquid-crystal plate, and a large format lens disposed between the color liquid-crystal plate and the monochrome TV display so as to focuss the observer's image on the screen of the TV display. The color liquid-crystal plate alternately displays stereo-pairs composed of left and right eye perspectives, and the monochrome TV display alternately displays inverted binary images of half face of each oberver. The large format lens distrubutes light emitted from the inverted binary images of half face of each observer to the left and right eyes of each observer through the color liquid-crystal plate, whereby the left and right eye perspectives of the stereo-pairs displayed by the liquid-crystal plate respectively reach the left and right eyes of each observer.

In view of the foregoing, there is a need in the art for apparatuses and methods for efficiently and accurately aligning stereoscopic three-dimensional displays. There is also a need for the applicable alignment hardware to be integrated into a stereoscopic three-dimensional adding minimal additional weight or complexity. There is further a need for a sterepscopic display to be adaptable and readily adjustable to be aligned to different camera geometries. There is further a need for such systems and apparatuses in aerospace applications. As detailed hereafter, these and other needs are met by embodiments of the present invention.

SUMMARY OF THE INVENTION

A method and apparatus for aligning the left and right image channels a two-image stereoscopic three-dimensional display is disclosed. A left and right alignment pattern may be shown on the left-eye and right-eye image screens, respectively, pre-computed for any given input imaging geometry. The operator (or alignment processor) then adjust the displays to converge the superimposed left-eye and right-eye test patterns by moving the display elements using display positioning equipment and/or software. This ensures that the stereoscopic three-dimensional display geometry matches the three-dimensional camera imaging geometry in order to produce a minimally-distorted visual depth perception of objects in space. Such precision alignment can be essential for efficient and safe telerobotic operation applications, as in the case of remote aerial refueling operations, for example.

Such and apparatus and method can make it possible for technicians with less expertise to check and correct binocular display alignment before use of the applicable stereoscopic display by following a related inventive method of opertion. Thus, embodiments of the invention provide a built-in test system for the alignment aspect of the dual-screen stereoscopic three-dimensional display unit.

A typical embodiment of the invention may comprise an apparatus for the alignment of a stereoscopic three-dimensional display including a beam splitter, a first display disposed to transmit a first test pattern through the beam splitter to be displayed through a common viewing aperture, a second display disposed to reflect a second test pattern through the beam splitter to be displayed superimposed with the first test pattern through the common viewing aperture, and one or more alignment controls for adjusting at least one of the first display and the second display to converge the first test pattern and the second test pattern through the common viewing aperture. The one or more alignment controls may adjust rotational, vertical, horizontal, tilt and camera convergence between the first test pattern and the second test pattern. Typically, the first display and the second display each comprise a liquid crystal display.

In further embodiments at least one of the one or more alignment controls comprises a computerized control (e.g. such as a digitally adjusted screen size) and at least a different one of the one or more alignment controls comprises a physical control (e.g. such as a motorized or hand-driven linear positioner). In addition, the one or more alignment controls may be manually operated, i.e. operated by hand. For example, the one or more alignment controls are manually operated to adjust rotation, vertical, horizontal and tilt alignment of each of the first display and the second display relative to the beam splitter to converge the first test pattern and the second test pattern through the common viewport.

In some embodiments, at least one of the one or more alignment controls are automatically operated to assist converging the first test pattern and the second test pattern. Such embodiments of the invention may include a feedback sensor viewing the superimposed first test pattern and the second test pattern and an alignment processor coupled to the feedback sensor to automatically operate at least one of the one or more alignment controls to assist converging the first test pattern and the second test pattern in response to the viewed superimposed first test pattern and the second test pattern.

Embodiments of the invention align the displays such that the first display operates through the common viewing aperture in a first polarization and the second display operates through the common viewing aperture in a second polarization distinct from the first polarization. Each of the displays, having their different polarizations, can be simultaneously viewed by the left and right eyes of the operator, e.g. through the use of glasses having a different polarized lens matching each of the different display polarizations for the left and right eye, respectively. In one particular application, the first display and the second display are aligned to present a real time stereoscopic display of an aircraft appendage for remote operation.

Similarly, a method embodiment for aligning a stereoscopic three-dimensional display comprises the operations of generating a first test pattern on a first display of the stereoscopic three-dimensional display, generating a second test pattern on a second display of the stereoscopic three-dimensional display, viewing the first test pattern and the second test pattern superimposed through a common viewing aperture of the stereoscopic three-dimensional display, and adjusting at least one of the first display and the second display with one or more alignment controls such that the first test pattern and the second test pattern converge. The method embodiment of the invention may be further modified consistent with the apparatus embodiments of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1A:
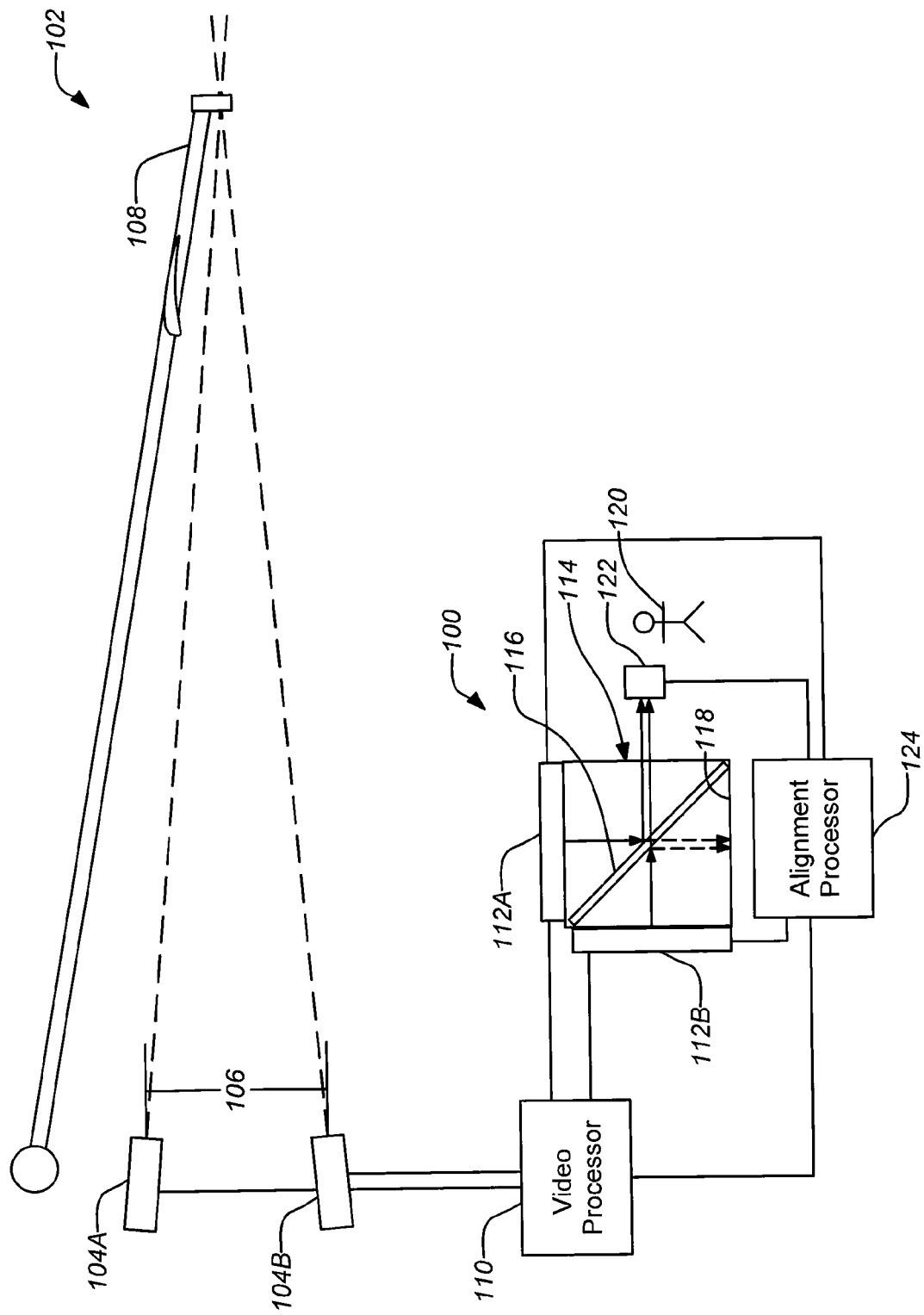
FIGS. 1A and 1B illustrates an exemplary system incorporating stereoscopic alignment in accordance with the invention.

Embodiments of the present invention are directed to a method and apparatus that provides assistance to an operator (e.g. a technician) in aligning the left and right image channels a two-image stereoscopic three-dimensional display by showing left and right alignment patterns on the left and right image screens, pre-computed for any given input imaging geometry, such that the operator has simply to visually superimpose the left and right test patterns by moving the display elements using display positioning equipment and/or software. This ensures that the stereoscopic three-dimensional display geometry matches the three-dimensional camera imaging geometry in order to produce a minimally-distorted visual depth perception of objects in space. An additional enhancement may be achieved by having these display adjustments performed automatically without requiring visual feedback to an operator in the loop. Such precision alignment can be essential for efficient and safe telerobotic operation applications, as is the case of remote aerial refueling operations, for example.

In one particular application, embodiments of the invention can be applied to present a real time stereoscopic image for remote operation of an aircraft appendage. For example, embodiments of the invention can comprise a stereoscopic three-dimensional display that incorporates a built-in alignment system to provide a minimally-distorted, real-time stereoscopic video depth perception to an aerial refueling operator (ARO) for the purpose of conducting aerial refueling efficiently and safely. As such, embodiments of the invention may be applied to the general system arrangement described in U.S. Pat. No. 4,298,176 by Kendall with enhanced performance or other more recently developed remotely guided vehicles.

No conventional stereoscopic three-dimensional display has this capability for easy and accurate binocular alignment of two-channel stereoscopic three-dimensional display visual geometry. Conventional displays do not match the quality of video that such a display system provides when it is correctly aligned in accordance with the present invention to match the imaging geometry.

2. Alignment of a Stereoscopic Three-Dimensional Display

As previously mentioned, the benefits of embodiments of the invention include reduced stress and visual fatigue to the user, optimally displayed video, with minimally distorted visual depth perception, and an easily configurable system, operable by non-expert technicians. In addition, a single display is readily adaptable to handle a variety of camera/imaging configurations. Thus, embodiments of the invention are directed to display properly converged and aligned stereoscopic video to the user and providing a three-dimensional display that can be easily configured and aligned, by non-expert personnel, for user-specific applications.

Embodiments of the invention allow a stereoscopic three-dimensional display to be correctly aligned, easily and accurately, by non-expert operators, in real-time, to avoid visual discomfort issues and to provide more efficient and safe operations by minimizing, rotational, vertical, horizontal, and tilt misalignments as well as distortions resulting from camera convergence and other imaging geometry factors.

Typically embodiments of the invention comprise test patterns and may also employ software to properly align and adjust the display to minimize these categories of misalignment and distortion. Embodiments of the invention can accomplish these adjustments automatically or allow for alignment by manually controlled positioning mechanisms visually guided by the test patterns shown on the left and right screens. The display may be designed for viewing with or without polarized glasses (or other types of three-dimensional glasses) worn by the operator. Embodiments of the invention allow for manual or automatic alignment and convergence adjustments to match a wide variety of stereoscopic camera configurations. Thus, the left-eye and right-eye modules within the display can be aligned and adjusted to correctly display stereoscopic video from different stereoscopic cameras and other video sources.

Figure 1B:
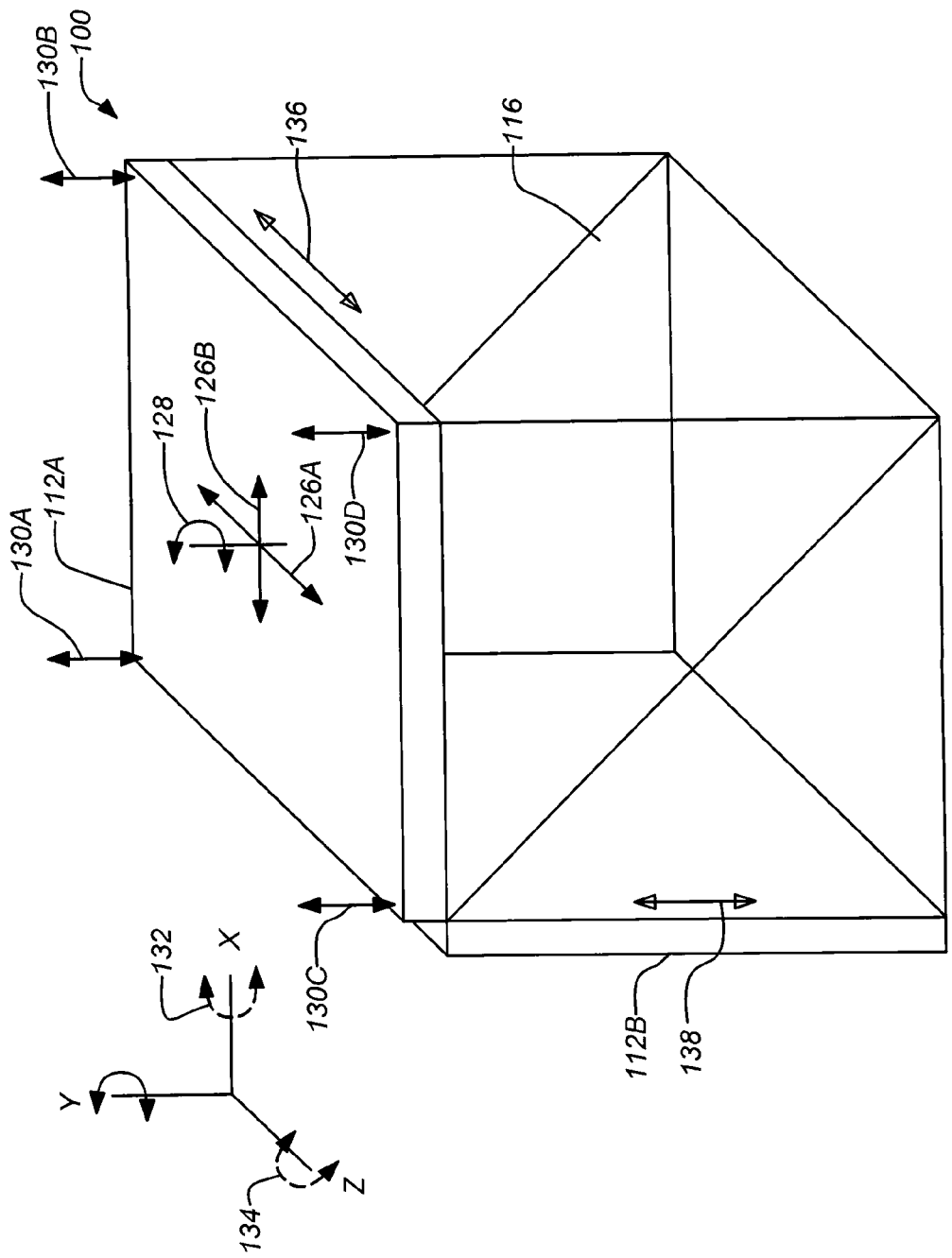

FIGS. 1A and 1B illustrates an exemplary alignable display system 100 incorporating stereoscopic alignment in accordance with the invention. Referring first to FIG. 1A, the alignable display system 100 receives image input from a stereoscopic camera system 102 comprising two cameras 104A, 104B disposed in specific relationship to provide images of virtually the same view from slightly differentiated vantage points. One key parameter of the camera geometry is the separation distance 106 between the two cameras 104A, 104B. However, many other factors in the camera configuration also play a role in determining the optimum alignment relationship which must then be translated into the proper alignment of the stereoscopic three-dimensional display elements. For example, the cameras 104A, 104B may be canted toward each other (i.e. toed in) slightly to establish a convergence point. The optimal convergence point (if any) will depend upon the intended application as well as the particular cameras 104A, 104B being used. In addition, the selected cameras 104A, 104B have a range of variables (e.g. the lens geometry) which can impact the ideal alignment of the displays. Those skilled in the art can develop the appropriate camera selection and arrangement for the intended application. Similarly, those skilled in the art can develop the associated optimized alignment for the applied alignable display system 100 which will receive the input from the stereoscopic camera system 102. Embodiments of the invention are directed to the efficient application of that knowledge into aligning the display system 100.

For example, in one particular application, the stereoscopic camera system 102 may be designed to provide a view of a remotely controlled aircraft appendage 108, e.g. such as a refueling boom of a tanker aircraft. The sterescopic camera system 102 provides video input which is properly aligned in the alignable display system 100 to present a real time stereoscopic video of the aircraft appendage with exceptional clarity.

The separate camera input from the cameras 104A, 104B is communicated to a video processor 110 which prepares the separate camera signal input for their respective displays 112A, 112B. The video processor 110 may comprise one or more separable units to perform a range of video processing functions such as video switching between multiple different camera systems 102, each having a potentially different camera configuration and requiring different alignments of the stereoscopic display system 100. Note that only one camera system 102 is shown; other camera systems are similar, but designed for other stereoscopic applications. During alignment of the display system 100, the video processor 110 generates the separate test patterns which are shown on each display 112A, 112B to be superimposed by the BSD 116 through the common viewing aperture 114.

The alignable display system 100 further includes two separate displays 112A, 112B arrange so that their delivered images are superimposed through a common viewing aperture 114 to an operator. Superimposing the delivered images may be accomplished through the use of a beam splitter device 116 known in the art. The beam splitter device (BSD) 116 essentially comprises a partially silvered mirror (which may also employ special coatings one or both surfaces). In addition, special coatings can be employed to optimize the BSD properties. For example, to equalize luminance of both displays as seen by the user the upper surface may be partially reflective due to metallized coatings or multi-layer dielectric coatings. To minimize secondary reflections from the back surface of the BSD glass, the lower surface may be treated with an anti-reflective coating, such as magnesium fluoride. Other coatings known to those skilled in the art may be similarly employed to obtain the necessary optical properties. The BSD 116 reflects a significant portion of the incident light from the top-mounted display 112A through the common viewing aperture 114 to deliver its image to the common viewing aperture (although some light is transmitted through the BSD 116 to be absorbed by a black surface 118. Simultaneously, a significant portion of the light from the back-mounted display 112B is transmitted through the BSD 116 and through the common viewing aperture 114 to deliver its image superimposed with that from the top-mounted display. In a similar manner, some light from the back-mounted display 112B is reflected off the BSD 116 to be absorbed by the black wall 118. Importantly, the two separate displays 112A, 112B deliver differently polarized images through the common viewing aperture 114. The different polarizations of the superimposed images are used to isolate the respective images from the displays 112A, 112B to the separate eyes of the operator 120 when the display system 100 is being used. The displays 112A, 112B may be CRTs or LCDs or any other display technology known in the art capable of being filtered or directly generating a polarized image output. Special glasses having lenses with matching polarized filters (one for each eye) may be used to accomplish this as is known in the art. In contrast, aligning display in accordance with an embodiment of the invention requires a superimposed view of both images (test patterns) from the separate displays 112A, 112B. It should be noted that the side display 112B may be disposed in any position, top, bottom, left or right relative to the common viewing aperture with the BSD 116 appropriately oriented to reflect the image of the side display 112B.

In general, the alignment process of the invention will be described herein as a manual process because the process is best understood when described as performed manually. However, embodiments of the invention also encompass analogous automation of the alignment processes described herein. A manual process is performed by an operator who observes the superimposed test patterns of each of the displays 112A, 112B and operates the adjustment controls of one or both of the displays to cause those test patterns to converge, indicating a proper alignment. Similarly, it should also be understood that the task of aligning the stereoscopic display system 100 may be divided into some automated alignment processes and some manual alignment processes. For example, image size (horizontal and vertical) as well as offset (horizontal and vertical) may be automated while eliminating keystone distortion may be performed manually.

Separate from the distinction between automated and manual alignment processes, there is also the distinction between physical and computerized (or solid state) alignment controls. A physical alignment control is one that makes a physical change in the position of one of the displays. For example, causing the display to physically rotate, translate or tilt are examples of physical alignment controls. In contrast, a computerized (or solid state) alignment control is one that changes the image on the display without any physical movement of the display. For example, a computerized alignment control may be performed in the video processor to alter the image (e.g. translate and/or resize) as it is presented on the display. Computertized alignment controls lend themselves to also be automated because the adjustments may be readily performed and implemented in software. However, it is possible for physical alignment controls to also be automated. For example, a tilt, rotation and/or translation adjustment control may be motor driven so that the adjustments can be controlled by a alignment processor. Embodiments of the invention encompass physical and/or computerized alignment controls which may be adjusted through manual and/or automated processes in any combination. However, it should also be noted that certain categories of alignment processes (e.g. keystone alignment) may introduce other distortions or be excessively computationally burdensome if they are performed through a computerized process rather than a direct physical adjustment (e.g. by physically tilting the display). The appropriate combination of physical and compterized alignment controls (and whether they are automated or manual) will be a function of the particular stereoscopic display application.

Referring back to FIG. 1A, any particular alignment control is either adjusted manually, by and operator 120 viewing the superimposed test patterns, or by an alignment processor 124 which similarly views the superimposed test patterns through a feedback sensor 122 coupled to the alignment processor 124. Accordingly, the alignment processor 124 is coupled to the alignment controls of the each of the displays 112A, 112B and/or the video processor 110 as necessary to adjust the necessary alignment aspect in order to converge the test patterns viewed superimposed through the common viewing aperture 114 by the feedback sensor 122. It should also be noted that the alignment processor 118 may also be incorporated as a component of the video processor 110. The feed back sensor may comprise a charge coupled device (CCD), or CMOS sensor or any other acceptable optical sensor known in the art. In addtion, the alignment processor may comprise analog or digital alignment controls (which may be programmable through loadable software) as will be understood by those skilled in the art.

FIG. 1B illustrates exemplary physical alignment controls which may be implemented for the top display 112A of the sterescopic three-dimensional display system 100. Physical alignment controls enable separate adjustment of the horizontal translation 126A and the vertical translation 126B as well as the rotation 128 (about the Y axis) of the display 112A. In addition, each corner of the display may be separately adjusted in a Y axis translation 130A-130D. The combined effect of the corner Y axis translations 130A-130D is to effect small rotations (canting) of the display 112A about the X axis 132 and or Z axis 134 as shown. Principally, the corner Y axis translations 130A-130D may be used to align the displays to eliminate keystone distortions. The same set of physical alignment controls may be relatively applied to the rear display 112B as well (not shown). Furthermore, in the example embodiment, the top display 112A may present horizontally polarized images (as indicated by the arrow 136) while the rear display 112B presents vertically polarized images (as indicated by the arrow 138).

3. Example Stereoscopic Three-Dimensional Display

Figure 2A:
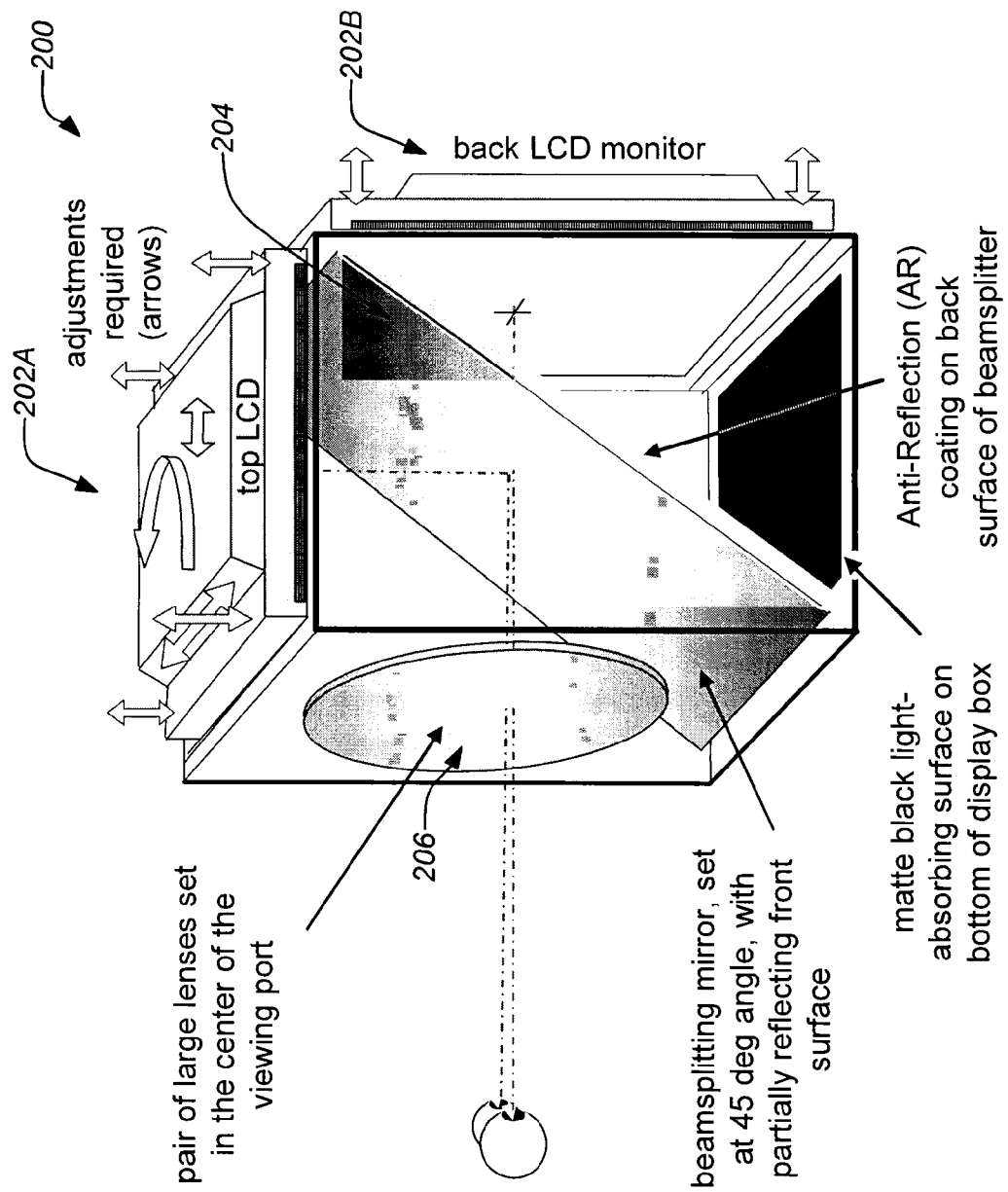
FIGS. 2A and 2B illustrates an exemplary stereoscopic three-dimensional display incorporating stereoscopic alignment in accordance with the invention.
Figure 2B:
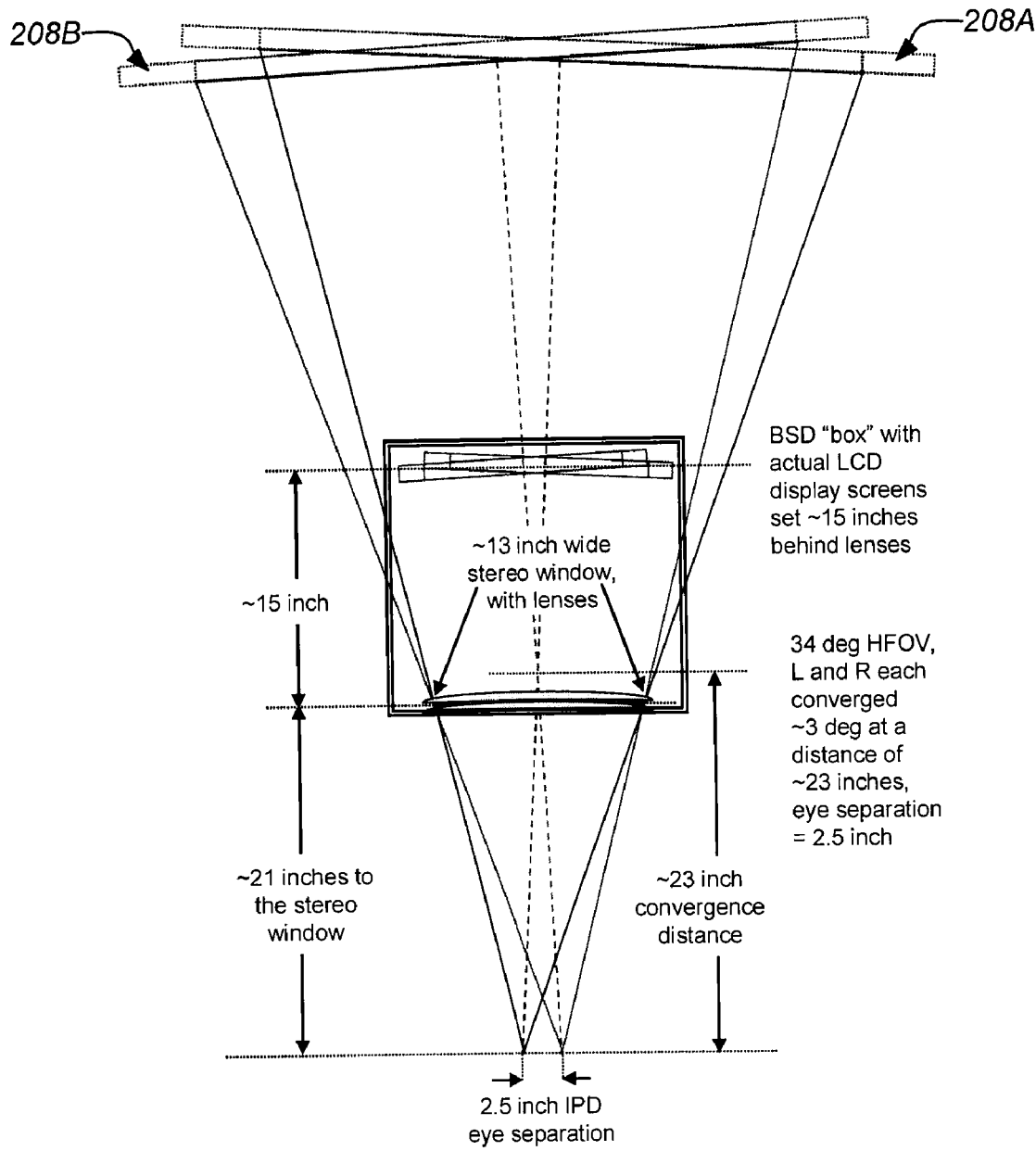

FIGS. 2A and 2B illustrates an exemplary structure 200 of a stereoscopic three-dimensional display incorporating stereoscopic alignment in accordance with the invention based upon a particular camera geometry application. FIG. 2A illustrates principal display components in an exemplary embodiment of the invention. The structure 200 of an exemplary embodiment of the invention shows the dual-screens 202A, 202B in the beamsplitter 204 display which exemplifies the issues involved in aligning the left and right image channels. The top LCD display 202A is seen reflected in the beamsplitter 204, while the back LCD display 202B is seen directly through the beamsplitter. Large viewing lenses 206 form virtual images of the two LCD displays 202A, 202B, providing a farther viewing distance, which is important for visual comfort when viewing stereoscopic images for longer periods of time.

FIG. 2B shows the complexity of the alignments required in an exemplary embodiment of the invention. The left and right display screens 202A, 202B should appear as virtual images approximately 65 inches from the operator's two eyes, separated and canted by about 3 degrees each, with the left and right lines of sight to the center pixels converged at approximately 23 inches from the eyes in order to match the imaging geometry of the exemplary camera system. The imaging system incorporates two video cameras, each with 34 deg horizontal field-of-view (HFOV), with camera optical axes converged by approximately 6 degrees, thus requiring matching convergence of the user's left and right eyes when fixating the center pixels of the left and right display screen images.

The exemplary design is directed to providing a comfortable two-channel stereoscopic three-dimensional video display that creates an ortho-stereoscopic percept of the refueling boom and receiver aircraft in the user's binocular visual space, scaled down by a hyper-stereo scale factor equal to the ratio between the camera separation and the user's eye separation. In the exemplary embodiment, the left and right cameras may be separated by approximately 17 inches, which is a scale factor of 6.8 times the average human eye separation of 2.5 inches. Key considerations include avoiding the so-called "stereo window frame violation," and ensuring that the user's eyes are not required to diverge beyond parallel when fixating distant objects in the scene, and minimizing "focus/fixation" mismatch between the distance at which the user's eyes are converged or fixated and the distance at which the user's eyes have to focus when viewing the displayed images.

The exemplary two-channel stereoscopic three-dimensional display system uses a beam-splitter between to displays to create in binocular perceptual space the equivalent of two virtual display screens that have an optical distance of approximately 0.67 diopters (approximately 5 feet from the eyes), with a 34 degree horizontal field-of-view subtended by the central 1024 pixels in each eye's virtual display screen as shown in FIG. 2B. The lines of sight of the left and right eyes to the center pixels of the two left and right virtual display screens 208A, 208B are converged at a distance of approximately 23 inches from the mid-point between the two eyes (6.2 degree convergence angle, assuming a 2.5 inch inter-pupillary distance (IPD) for the average user. The edges of the two horizontal fields of view intersect to form an approximately 13-inch-wide stereo window approximately 21 inches from the eyes along display system centerline. The purpose of doing this is to avoid so-called stereoscopic "frame violations" where the viewed aircraft appendage may intersect the top of the stereo window. This difference between the focus (approximately 5 feet) and the convergence (approximately 23 inches) departs from traditional stereo display design, in which ocular focus and display convergence are usually matched at the same distance. The rationale for this is discussed hereafter.

In the exemplary stereoscopic three-dimensional system, the stereoscopic window is positioned by converging the two camera optical centerlines at a distance of approximately 13 feet (by toe-in of the cameras rather than by laterally sliding the sensor chips), which is the optical centerline distance at which the refueling boom intercepts the upper edge of the camera field of view. Since the left and right camera lenses may be separated by 17 inches in order to enhance depth acuity, (forming a convergence angle of 6.2 degrees), the two display modules in the BSD should be converged or "canted" to the same 6.2 degree angle, to minimize keystone distortion of binocular visual space. The optical distance of the display modules may be set to 0.67 diopters (approximately 5.5 ft) because the operator will spend most of the time viewing a distance of approximately 52.4 feet in the design application (which will appear to be approximately 7.7 feet in the 1/6.8 "scale model" view created by the hyper-stereo camera separation).

The exemplary embodiment comprises a hyper-stereoscopic video display to provide enhanced depth perception for the boom operator when performing aerial refueling. The display obtains a left and right stereoscopic pair of retinal images by means of the BSD rather than from a single shuttered stereoscopic panel-mounted CRT display, as in other previous systems. This difference should help minimize certain problems encountered with the previous shuttered display.

Previous system's using panel-mounted stereoscopic displays employed an electrically switchable polarizing shutter screen over a single CRT display faceplate. This permitted the use of passive polarized glasses for the operators, but there was some "ghosting" or cross-talk between the left and right images. Since the left-eye and right-eye imagery are no longer shuttered on the same screen in this example embodiment by employing separate polarized LCD displays, ghosting due to residual image decay is no longer present. However, there may still be some ghosting with the two-display BSD system due to "leakage" in the polarizing filters used to separate the left and right views for each eye, and thus quality of the optical means used to separate the left and right views, is important.

To minimize the adverse effects of ghosting, and to provide for a visually workable display in the event of shutter failure, the previous systems have converged the left and right cameras at the distance where the primary observation is to occur in the intended application, e.g. the location where a refueling appendage will dock. This convergence, however, created a visually disturbing stereoscopic effect: Operators have complained that it appeared unnatural for the refueling boom, which appeared to be sticking out in front of the stereo window, to be cut off by the top of the stereo window, which was seen as being behind it. This was due to the convergence of the cameras at the distance of the center of the viewing envelope, about 60 feet from the cameras. Everything in the scene that was closer than that convergence distance, particularly the aircraft appendage, would appear in stereoscopic depth to be in front of the display screen window.

This well-known problem in stereoscopic display design is often referred to as a "frame violation," or "window violation," which occurs when an virtual three-dimensional object is closer than the stereoscopic display window frame, but is paradoxically cut off by the frame behind it. In normal "direct" viewing, a window frame cuts off only those objects behind the window, and thus it can appear unnatural and perceptually disturbing for the stereo window (usually corresponding to the edges of the display) to cut off three-dimensional objects that appear to be in front of the window.

In the exemplary embodiment, the BSD affords the opportunity to create a stereoscopic window frame that naturally appears at an optical distance just in front of the closest object in the scene, e.g. the aircraft appendage at the point where it disappears from view at the center of the upper edge of the stereoscopic display window. In doing this, the left and right BSD displays are canted so their optical centerlines cross at approximately 23 inches from the user, creating a stereoscopic window frame that is about 21 inches from the observer's eyes.

Generally, to avoid "frame violations" in a stereoscopic display, the left and right display windows may be "converged", by various techniques, to make the edges of the stereo window appear in front of the scene objects that are cut off by the window. However, if the optical distance of the individual display elements is behind the window (in order to minimize focus/fixation mismatch when viewing objects through the window), the stereo window edges will still appear in sharp focus, inconsistent with their binocularly doubled appearance.

The "mid-window" concept involves creating a physical aperture at the location of the stereo window with an optical distance that is consistent with its apparent binocular distance, and thus it appears naturally blurred when looking "through" the stereo window at more distant objects in the scene. This mid-window concept involves the use of a BSD with a "mid-window aperture" inserted between the display screen and the observer. Basically, the BSD physical mid-window, placed between the physical display and the viewing aperture, creates a more natural stereoscopic frame by giving observers natural focus cues as well as binocular fixation cues that are consistent with looking through an actual window at more distant objects of interest in the scene.

The toe-in method of converging the cameras and BSD modules is used because both left and right cameras must be identical, with no horizontal shift of lens or sensor chip relative to each other. The generally preferred method of convergence by the lateral shift method would require symmetrically opposite shifts in the left and right cameras, and that would require two different types of cameras, a "left" and a "right" version. It is generally recognized that lateral shifting of the lenses or chips as a means of convergence is superior to the toe-in method of convergence; however, toe-in, with its attendant complexities of imaging geometry, allows use of a single camera type. This requires toe-in as the method for corresponding convergence of the left and right BSD modules, as is presently done in some existing BSD units by canting the left and right modules inward to match the toe-in convergence angle of the left and right cameras.

The complex display alignment requires precise positional adustments of displays and other components. Note the lateral shift and rotation of the virtual images of the display screens, required to make display geometry match camera geometry. This can be tedious and inaccurate without proper test patterns on the screens.

4. Example Test Patterns

FIGS. 3A to 3D show some example test patterns as may be employed in a typical embodiment of the invention. The sequence of pattern images also further illustrates the alignment process.

Figure 3A:
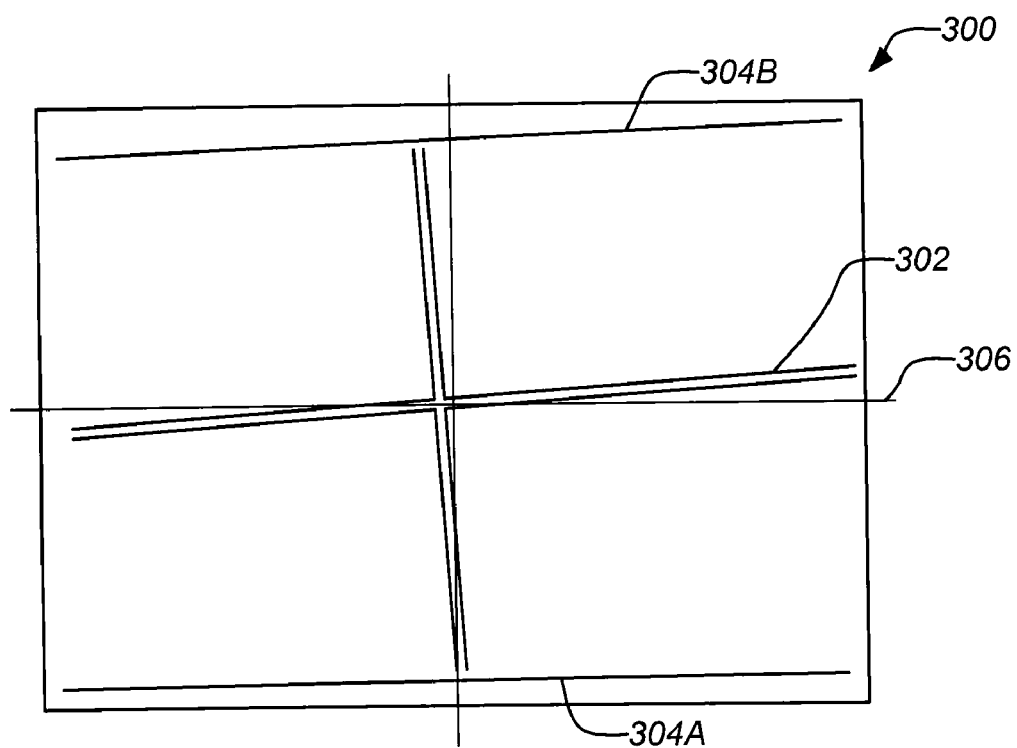
FIG. 3A illustrates a first test pattern of a first display of a stereoscopic display for aligning the stereoscopic display.

FIG. 3A illustrates a first test pattern 300 of a first display of a stereoscopic display for aligning the stereoscopic display. The test pattern includes a pattern crosshair 302, which in this example is presented slightly rotated and offset. When the display is aligned, the adjustment controls have been operated to rotate and translate the display until the crosshair 302 appears converged with the second test pattern 308 of the second display as described hereafter. Keystone distortion (e.g. which may occur with a camera configuration employing canted or toed in cameras) may be aligned out through a use of non-parallel lines 304A, 304B. If the two straight lines 304A, 304B are closer together on the left, after adjusting the display such that the left edge is farther from the viewing apertures (and/or the right edge is closer to the viewing aperture), the lines will appear parallel and any horizontal keystone distortion (of an image from the applicable camera configuration) will be eliminated. Analogously, vertical lines (not shown) may be used to eliminate any vertical keystone distortion.

As shown, the test pattern includes an extra crosshair 306, representing the physical center of the display on which the test pattern 300 is displayed. This crosshairs 306 is only provided to better illustrate test pattern difference as part of the alignment process and would not necessarily be present as part of an actual alignment process. One can see from this extra crosshair 306 that the test pattern crosshair 302 is intentionally offset and rotated relative to the physical display. The alignment process is complete, the end result will be to have the test pattern crosshair 302 counter rotated and translated to converge with the superimposed second test pattern 308 of the second display. Thus, this display will have a rotated and offset (and canted) position, predetermined as the optimum alignment position for the given camera configuration this application employs.

Figure 3B:
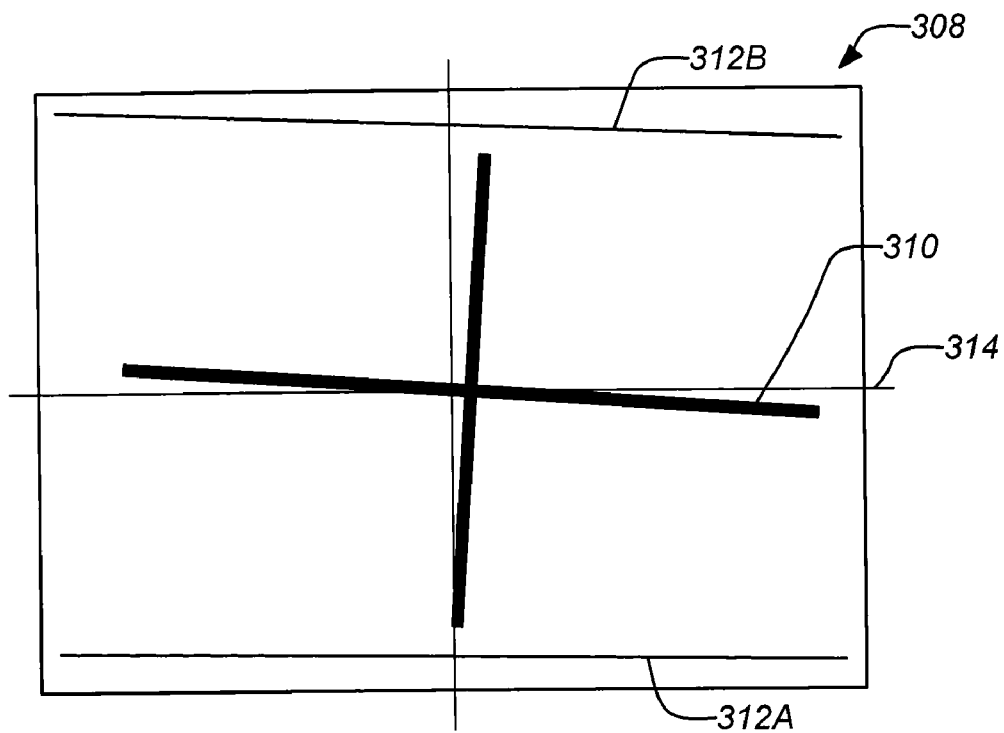
FIG. 3B illustrates a second test pattern of a second display of a stereoscopic display for aligning the stereoscopic display.

FIG. 3B illustrates a second test pattern 308 of a second display of a stereoscopic display for aligning the stereoscopic display. The second display also employs a test pattern crosshair 310 for properly aligning rotation and offset of the display dictated by the camera system configuration. This test pattern 308 is essentially a mirror image of the first test pattern 300, indicating that converging the superimposed test patterns will require adjustments in opposite directions on the alignment controls for each display. Here also an extra crosshair 314 is shown for the same purpose as extra crosshair 306 of the first test pattern 300 above.

Figure 3C:
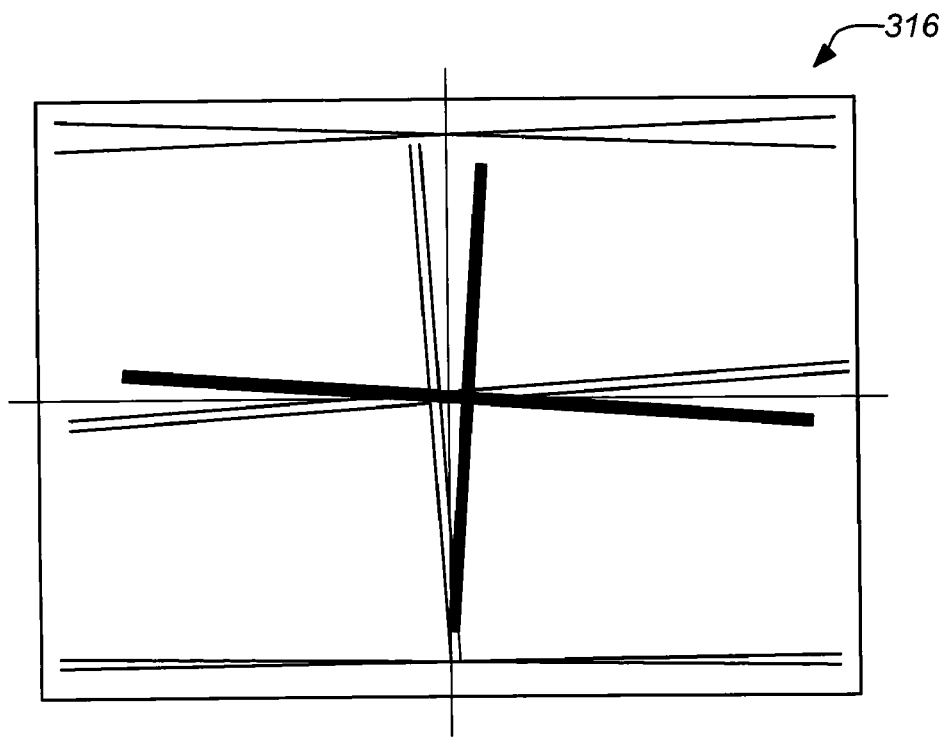
FIG. 3C illustrates the first and second test pattern superimposed before aligning the display.

FIG. 3C illustrates the superimposed first and second test patterns 316 before aligning the display. Separate display adjustment controls of each display (computerized and/or physical as previously described) are then operated to properly shift the appearance of the superimposed test patterns 300, 308 until they converge. It is important to note that convergence does not necessarily mean that each of the test patterns appear as identical (although that is an option). Convergence of the test patterns 300, 308 only means that the superimposed patterns take on an appearance discernable by the operator to be aligned. Further adjustment of any particular alignment control only moves the appearance of the superimposed images away from the aligned (converged) appearance.

Figure 3D:
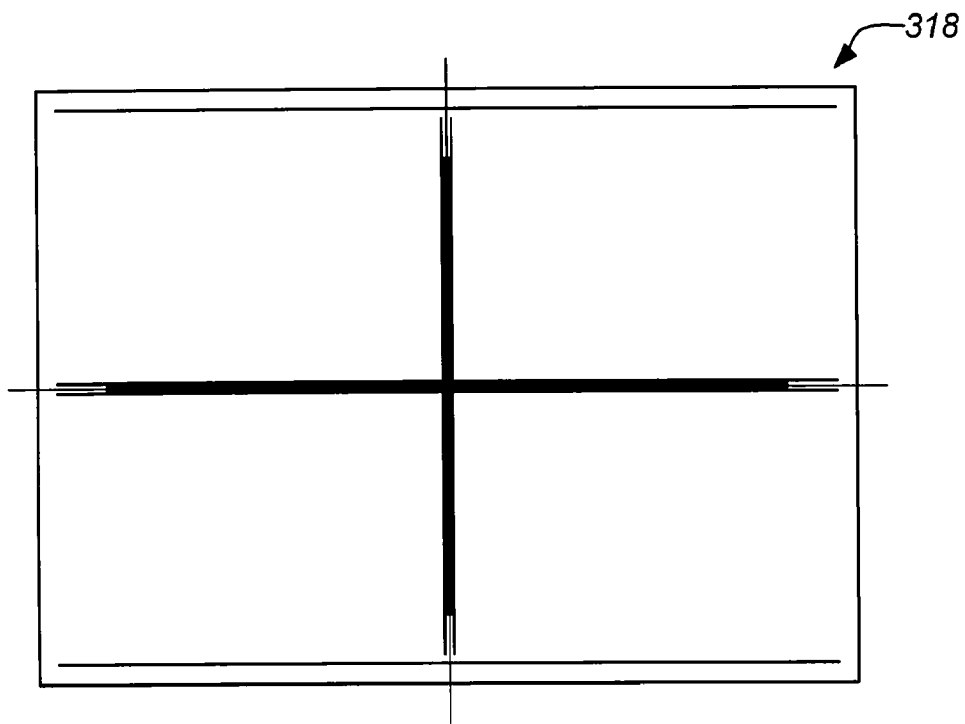
FIG. 3D illustrates the first and second test pattern superimposed after aligning the display.

FIG. 3D illustrates the superimposed first and second test patterns converged 318 after aligning the display. The final result here is that the two displays are properly aligned to each other (as well as being centered on the viewing aperture). In the example provided, each test pattern employs a different test pattern crosshair 302, 310, with one appearing as an outline of the other. Convergence of the test patterns in this example means the crosshairs 302, 310 line up to appear as a single solid crosshair. On the other hand, the sets of parallel lines 304A, 304B and 312A, 312B to eliminate keystone distortion converge when different patterns appear identical, as a single pair of parallel lines (which also indicated the displays have their vertical sizes aligned).

It is important to note that many alternate patterns may be developed by those skilled in the art within the scope of the invention. Furthermore, separate pairs of test patterns may be employed to isolate the alignment of different properties of the display. For example, a grid pattern may be applied to each display to eliminate keystone distortion and align image size. Separately, crosshair patterns may be employed to align rotation and translation.

Embodiments of the invention achieve the previously described objectives by assisting non-expert technicians and operators in confirming that binocular alignment is correct, and by making it easy to adjust and correct misalignments that may occur in use. A pre-computed left and right test pattern system allows for the stereoscopic three-dimensional display to be checked before each mission (and even during a mission) to correct any misalignment between imaging and display geometry.

Employing alignment test patterns makes it easy for non-technical personnel to test and align the left and right display channels. Conventional stereoscopic display systems, operated without pre-computed test patterns, are often difficult and tedious to align, and typically require a high level of expertise. Consequently, stereoscopic three-dimensional displays are often left misaligned, resulting in operator errors and a multitude of operator complaints about visual discomfort. A common complaint of operators is that conventional three-dimensional display hurt the eyes. This effect is usually due to using a misaligned three-dimensional display. A method embodiment of aligning a stereoscopic display system in accordance with the present invention is described in the next section.

5. Method of Aligning a Stereoscopic Three-Dimensional Display

Embodiments of the invention also encompass a method of cooling an electronic circuit consistent with the foregoing apparatus. The initial object is to form a hermetic cavity over the electronic circuit to be cooled and partially fill it with an appropriate non-conductive fluid. However, the use of the outer frame and flexure significantly improve the technique.

Figure 4:
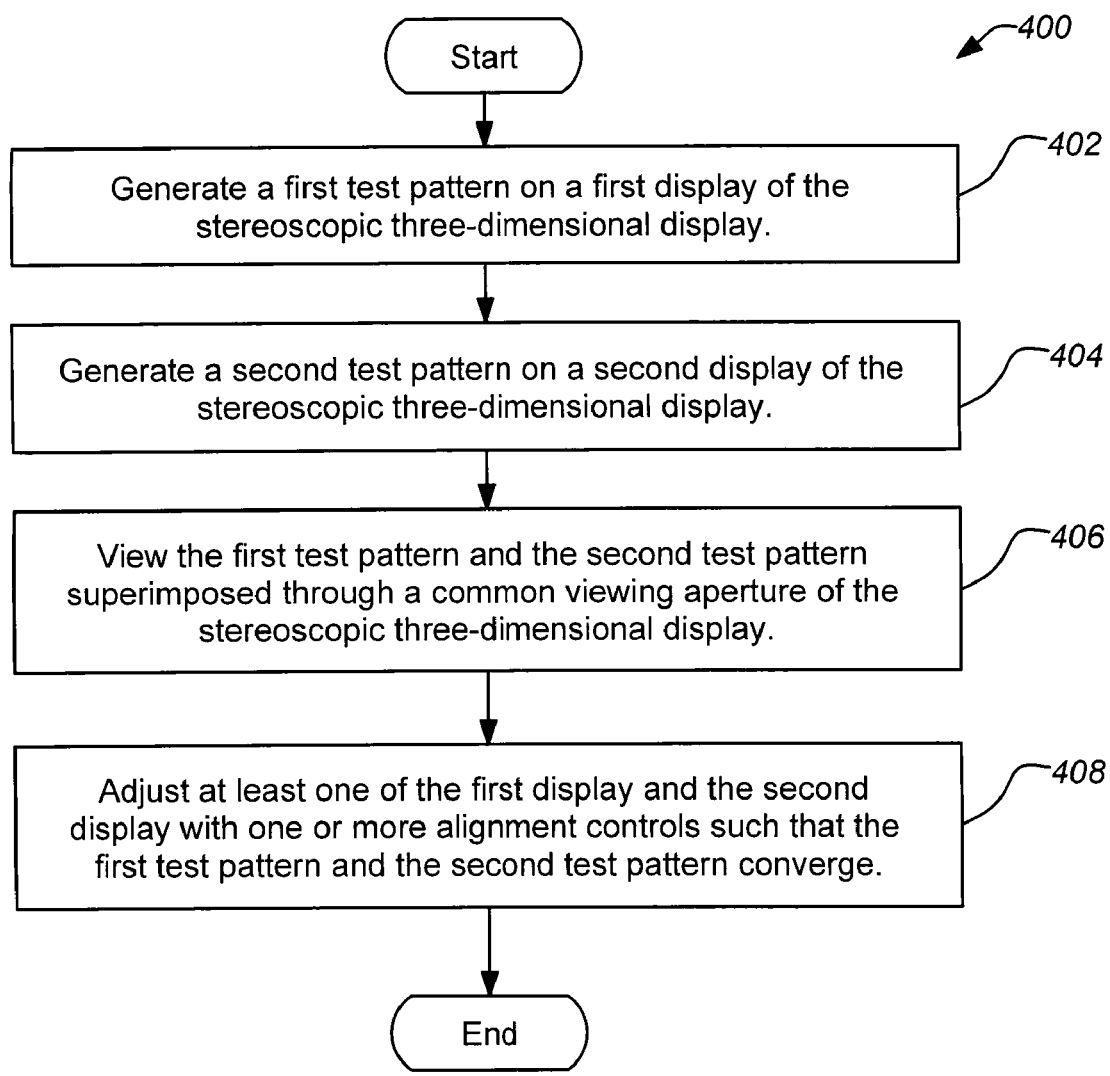
FIG. 4 is a flowchart of an exemplary method for aligning a stereoscopic three-dimensional display.

FIG. 4 is a flowchart of an exemplary method 400 for aligning a stereoscopic three-dimensional display. The method 400 begins with an operation 402 of generating a first test pattern on a first display of the stereoscopic three-dimensional display. Next, in operation 404 a second test pattern is generated on a second display of the stereoscopic three-dimensional display. Following this, the first test pattern and the second test pattern are viewed superimposed through a common viewing aperture of the stereoscopic three-dimensional display in operation 406. Finally, in operation 408, at least one of the first display and the second display are adjusted with one or more alignment controls such that the first test pattern and the second test pattern converge.

The method 400 may be further modified consistent with any of the apparatus embodiments previously described. For example, the one or more alignment controls may adjust rotational, vertical, horizontal, tilt and camera convergence between the first test pattern and the second test pattern. The alignment controls may be computerized controls and/or physical controls as previously described. In addition, the alignment controls may be manually and/or automatically operated as previously described.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for the alignment of a stereoscopic three-dimensional display comprising:
   a beam splitter;
   a first display disposed to transmit a first test pattern through the beam splitter to be displayed through a common viewing aperture;
   a second display disposed to reflect a second test pattern through the beam splitter to be displayed superimposed with the first test pattern through the common viewing aperture; and
   one or more alignment controls for adjusting at least one of the first display and the second display to converge the first test pattern and the second test pattern through the common viewing aperture;
   wherein the first test pattern and the second test pattern are pre-computed for a given input imaging geometry.

2. The apparatus of claim 1, wherein the one or more alignment controls adjust rotational, vertical, horizontal, tilt and camera convergence between the first test pattern and the second test pattern.

3. The apparatus of claim 1, wherein at least one of the one or more alignment controls comprises a computerized control and at least a different one of the one or more alignment controls comprises a physical control.

4. The apparatus of claim 1, wherein the one or more alignment controls are manually operated.

5. The apparatus of claim 4, wherein the one or more alignment controls are manually operated to adjust rotation, vertical, horizontal and tilt alignment of each of the first display and the second display relative to the beam splitter to converge the first test pattern and the second test pattern through the common viewport.

6. The apparatus of claim 1, wherein at least one of the one or more alignment controls are automatically operated to assist converging the first test pattern and the second test pattern.

7. The apparatus of claim 6, further comprising a feedback sensor viewing the superimposed first test pattern and the second test pattern; and
an alignment processor coupled to the feedback sensor to automatically operate at least one of the one or more alignment controls to assist converging the first test pattern and the second test pattern in response to the viewed superimposed first test pattern and the second test pattern.

8. The apparatus of claim 1, wherein the first display and the second display each comprise a liquid crystal display.

9. The apparatus of claim 1, wherein the first display and the second display are aligned to present a real time stereoscopic display of an aircraft appendage for remote operation.

10. The apparatus of claim 1, wherein the first display operates through the common viewing aperture in a first polarization and the second display operates through the common viewing aperture in a second polarization distinct from the first polarization.

11. A method for aligning a stereoscopic three-dimensional display comprising:
generating a first test pattern on a first display of the stereoscopic three-dimensional display;
generating a second test pattern on a second display of the stereoscopic three-dimensional display;
viewing the first test pattern and the second test pattern superimposed through a common viewing aperture of the stereoscopic three-dimensional display; and
adjusting at least one of the first display and the second display with one or more alignment controls such that the first test pattern and the second test pattern converge;
wherein the first test pattern and the second test pattern are pre-computed for a given input imaging geometry.

12. The method of claim 11, wherein the one or more alignment controls adjust rotational, vertical, horizontal, tilt and camera convergence between the first test pattern and the second test pattern.

13. The method of claim 11, wherein at least one of the one or more alignment controls comprises a computerized control and at least a different one of the one or more alignment controls comprises a physical control.

14. The method of claim 11, wherein the one or more alignment controls are manually operated.

15. The method of claim 14, wherein the one or more alignment controls are manually operated to adjust rotation, vertical, horizontal and tilt alignment of each of the first display and the second display relative to the beam splitter to converge the first test pattern and the second test pattern through the common viewport.

16. The method of claim 11, wherein at least one of the one or more alignment controls are automatically operated to assist converging the first test pattern and the second test pattern.

17. The method of claim 16, wherein viewing the superimposed first test pattern and the second test pattern is performed by a feedback sensor and adjusting at least one of the first display and the second display is performed by an alignment processor coupled to the feedback sensor to automatically operate at least one of the one or more alignment controls to assist converging the first test pattern and the second test pattern in response to the viewed superimposed first test pattern and the second test pattern.

18. The method of claim 11, wherein the first display and the second display each comprise a liquid crystal display.

19. The method of claim 11, wherein the first display and the second display are aligned to present a real time stereoscopic display of an aircraft appendage for remote operation.

20. The method of claim 11, wherein the first display operates through the common viewing aperture in a first polarization and the second display operates through the common viewing aperture in a second polarization distinct from the first polarization.

21. The method of claim 11, wherein the stereoscopic three-dimensional display comprises:
a beam splitter;
a first display disposed to transmit the first test pattern through the beam splitter to be displayed through a common viewing aperture;
a second display disposed to reflect the second test pattern through the beam splitter to be displayed superimposed with the first test pattern through the common viewing aperture; and
one or more alignment controls for adjusting at least one of the first display and the second display to converge the first test pattern and the second test pattern through the common viewing aperture.

22. An apparatus for the alignment of a stereoscopic three-dimensional display comprising:
a beam splitter means for reflecting and transmitting test patterns;
a first display means for generating a first test pattern disposed to transmit the first test pattern through the beam splitter to be displayed through a common viewing aperture;
a second display for generating a second test pattern disposed to reflect the second test pattern through the beam splitter to be displayed superimposed with the first test pattern through the common viewing aperture; and
one or more alignment control means for adjusting at least one of the first display and the second display to converge the first test pattern and the second test pattern through the common viewing aperture;
wherein the first test pattern and the second test pattern are pre-computed for a given input imaging geometry.

23. The apparatus of claim 22, wherein at least one of the one or more alignment control means are automatically operated to assist converging the first test pattern and the second test pattern.

24. The apparatus of claim 22, further comprising a feedback sensor means for viewing the superimposed first test pattern and the second test pattern; and
an alignment processor means coupled to the feedback sensor for automatically operating at least one of the one or more alignment controls to assist converging the first test pattern and the second test pattern in response to the viewed superimposed first test pattern and the second test pattern.

* * * * *